(12) United States Patent
Chung et al.

(10) Patent No.: US 10,933,542 B2
(45) Date of Patent: Mar. 2, 2021

(54) ROBOT AND INDUSTRIAL ROBOT WITH LIGHT DEVICE FOR INDICATING THE STATE OF ACTUATORS

(71) Applicant: Flexiv Ltd., Santa Clara, CA (US)

(72) Inventors: Shuyun Chung, San Jose, CA (US); Shiquan Wang, Foster City, CA (US)

(73) Assignee: Flexiv Ltd., Grand Cayman (KY)

( * ) Notice: Subject to any disclaimer, the term of this patent is extended or adjusted under 35 U.S.C. 154(b) by 0 days.

(21) Appl. No.: 16/439,342

(22) Filed: Jun. 12, 2019

(65) Prior Publication Data

US 2020/0391394 A1 Dec. 17, 2020

(51) Int. Cl.
| | |
|---|---|
| *B25J 19/06* | (2006.01) |
| *G08B 5/36* | (2006.01) |
| *H05B 45/10* | (2020.01) |
| *H05B 45/20* | (2020.01) |
| *B25J 18/00* | (2006.01) |
| *F21Y 115/10* | (2016.01) |

(52) U.S. Cl.
CPC ............... *B25J 19/06* (2013.01); *B25J 18/00* (2013.01); *G08B 5/36* (2013.01); *H05B 45/10* (2020.01); *H05B 45/20* (2020.01); *F21Y 2115/10* (2016.08)

(58) Field of Classification Search
None
See application file for complete search history.

(56) References Cited

U.S. PATENT DOCUMENTS

| | | | |
|---|---|---|---|
| 9,375,841 B1 * | 6/2016 | Kemper | ................... B25J 17/00 |
| 2019/0099903 A1 * | 4/2019 | Goto | ........................ G08B 5/36 |

* cited by examiner

*Primary Examiner* — John F Mortell
(74) *Attorney, Agent, or Firm* — K&L Gates LLP

(57) ABSTRACT

An industrial robot and a robot are provided. The industrial robot may include a number of links, a number of actuators connected by the links, a number of light devices and a controller. Each light device may be arranged around the respective actuator and between two adjacent links. The controller may be utilized to control each light device to indicate the state of the respective actuator. Since the light device is arranged around the actuator, a user of the robot may observe the light device at any position relative to the robot. Thus, the user may easily learn the state of the actuators of the robot based on the lighting of the corresponding light device.

15 Claims, 7 Drawing Sheets

ROBOT AND INDUSTRIAL ROBOT WITH LIGHT DEVICE FOR INDICATING THE STATE OF ACTUATORS

TECHNICAL FIELD

The present disclosure generally relates to the robotic technology field, and in particular to a robot and an industrial robot with light devices for indicating the state of actuators.

BACKGROUND

In the human-robot co-working environment, it is helpful for an operator of a robot to be aware of the robot's operating state. Current industrial robots usually do not have a signal display indicating to an operator the robot's operating state, or only have a simple on/off switch light. Thus, the operator cannot easily ascertain the state of the robot or interpret the robot's behavior, which may limit the interaction between the operator and the robot.

SUMMARY

Accordingly, the present disclosure aims to provide a robot and an industrial robot in order to help a robot operator better ascertain the state of the robot in operation.

To solve the above-mentioned problem, an industrial robot may be provided with indicators for the state of the robot. The industrial robot may include a plurality of links, a plurality of actuators connected by the plurality of links, a plurality of light devices, and a controller. The plurality of light devices may each be arranged around a respective one of the plurality of actuators and between two adjacent ones of the plurality of links. The controller may be configured to control each of the plurality of light devices to indicate a state of the respective one of the plurality of actuators.

In another embodiment, a robot may be provided that includes multiple links, multiple actuators connected by the links, and multiple light devices. Each of the multiple light devices may be arranged around a respective one of the actuators, and may each comprise an annular seal, a light emitting device, and a controller. The annular seal of each light device may be located between two adjacent links and may be transparent or translucent. The light emitting device of each light device may be located at an inner side of the annular seal. The controller of each light device may be configured to control the light emitting device of each of the light devices to indicate a state of the respective one of the actuators.

In another embodiment, a robot may be provided that includes at least one actuator, multiple links connected by the at least one actuator, at least one light device corresponding to the at least one actuator, at least one torque sensor, and a controller. The at least one light device may be arranged around the at least one actuator and between the adjacent links. The at least one torque sensor may be configured to detect a torque experienced by the at least one actuator. The controller may be configured to estimate an external torque applied upon the at least one actuator based on the torque detected by the at least one torque sensor and a dynamic model of the robot, and to adjust an intensity of light emitted by the at least one light device based on the external torque applied upon the at least one actuator.

According to the present disclosure, the light device is arranged around the actuator. Thus, a user of the robot may observe the light device at any position relative to the robot. Accordingly, the user may easily ascertain the state of the actuators of the robot based on the lighting of the corresponding light device. The implementation of the present disclosure may help the operator of the robot to better interact with the robot.

BRIEF DESCRIPTION OF THE DRAWINGS

In order to clearly explain the technical solutions in the embodiments of the present disclosure, the drawings used in the description of the embodiments will be briefly described below. The drawings in the following description are merely exemplary embodiments of the present disclosure. For those of ordinary skill in the art, other embodiments may also be derived based on these drawings without any creative work.

DETAILED DESCRIPTION

The disclosure will now be described in detail with reference to the accompanying drawings and examples. The described embodiments are merely exemplary and represent a subset of the embodiments of the present disclosure. One skilled in the art may recognize additional embodiments based on the embodiments of the present disclosure without creative efforts and all such embodiments fall within the scope of the present disclosure.

Figure 1:
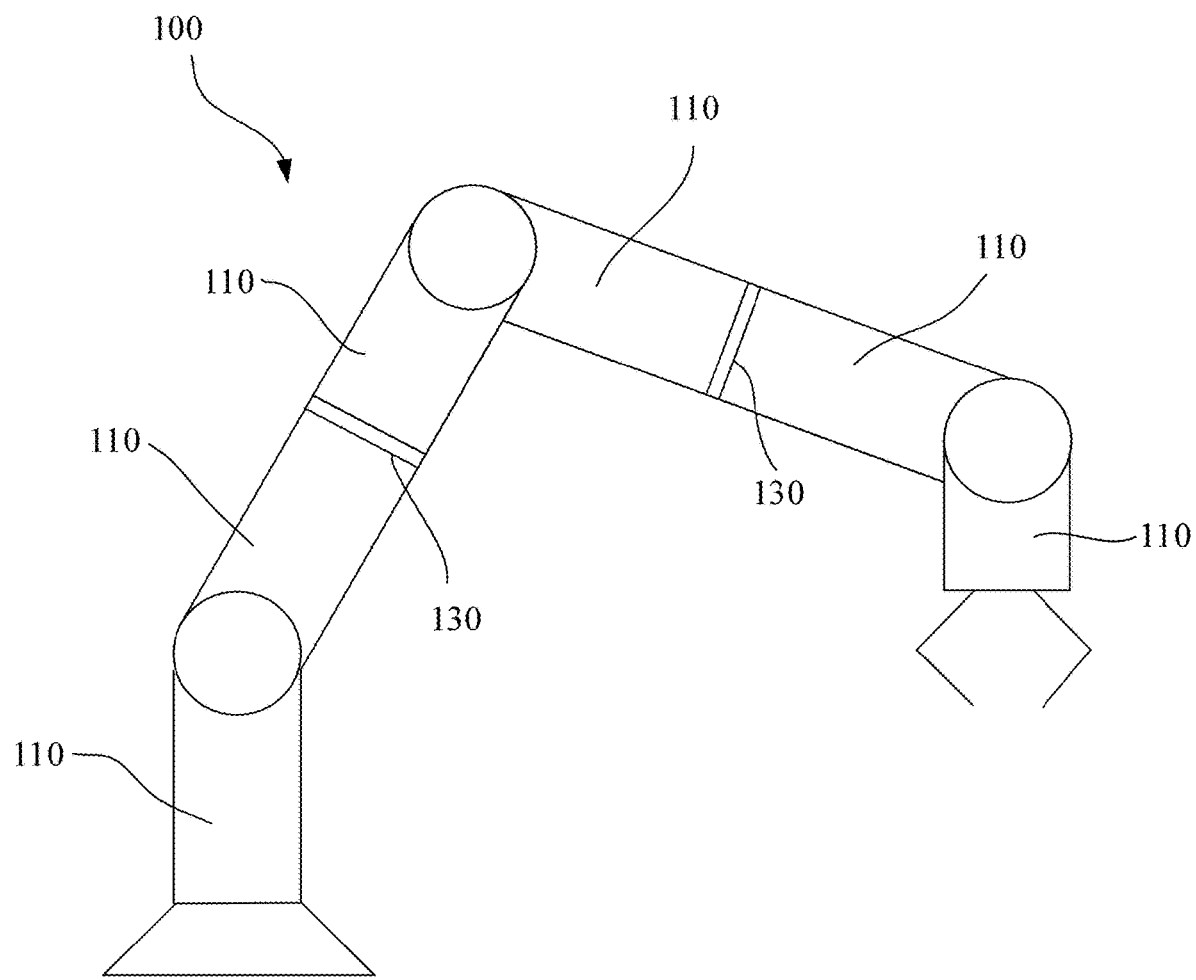
FIG. 1 illustrates a structural diagram of a robot according to an embodiment of the present disclosure.
Figure 3:
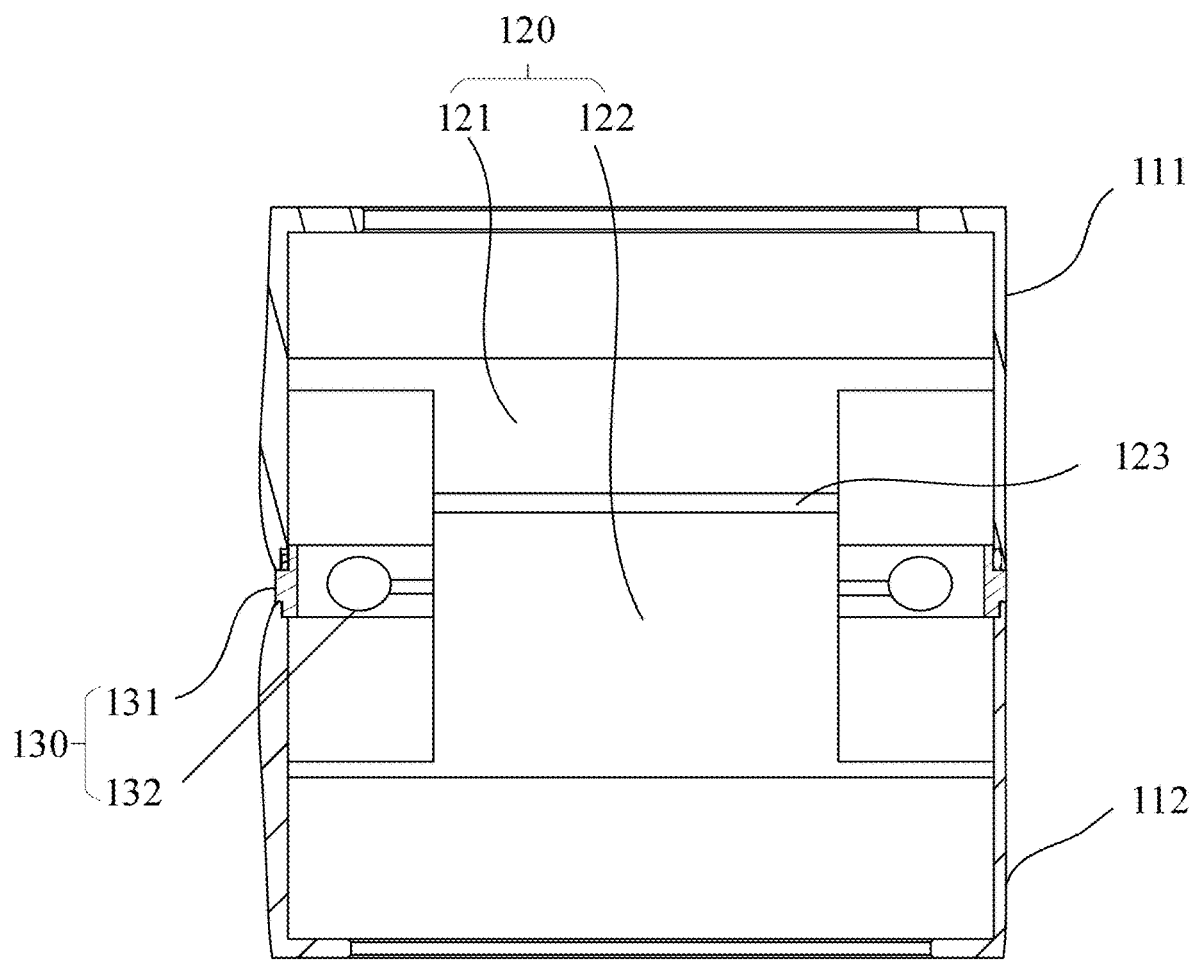
FIG. 3 shows an exemplary inner structure of a robotic joint according to an embodiment of the present disclosure.

FIG. 1 illustrates an example robot 100 according to an embodiment of the present disclosure. The example robot 100 may be an industrial robot or any other type of robot, for example, a humanoid type robot. The example robot 100 may include a number of links 110 (also called arms), light devices 130, and actuators 120 (FIG. 3). It should be appreciated that, in the example illustrated embodiment of FIG. 1, the actuators 120 are located within the links 110 and light devices 130 and thus the actuators 120 are not visible. The links 110, or arms, may rotate along a single axis (i.e., one-dimensional) as illustrated, along two axes (i.e., two-dimensional), or may have freedom to move anywhere in a three-dimensional space.

Figure 2:
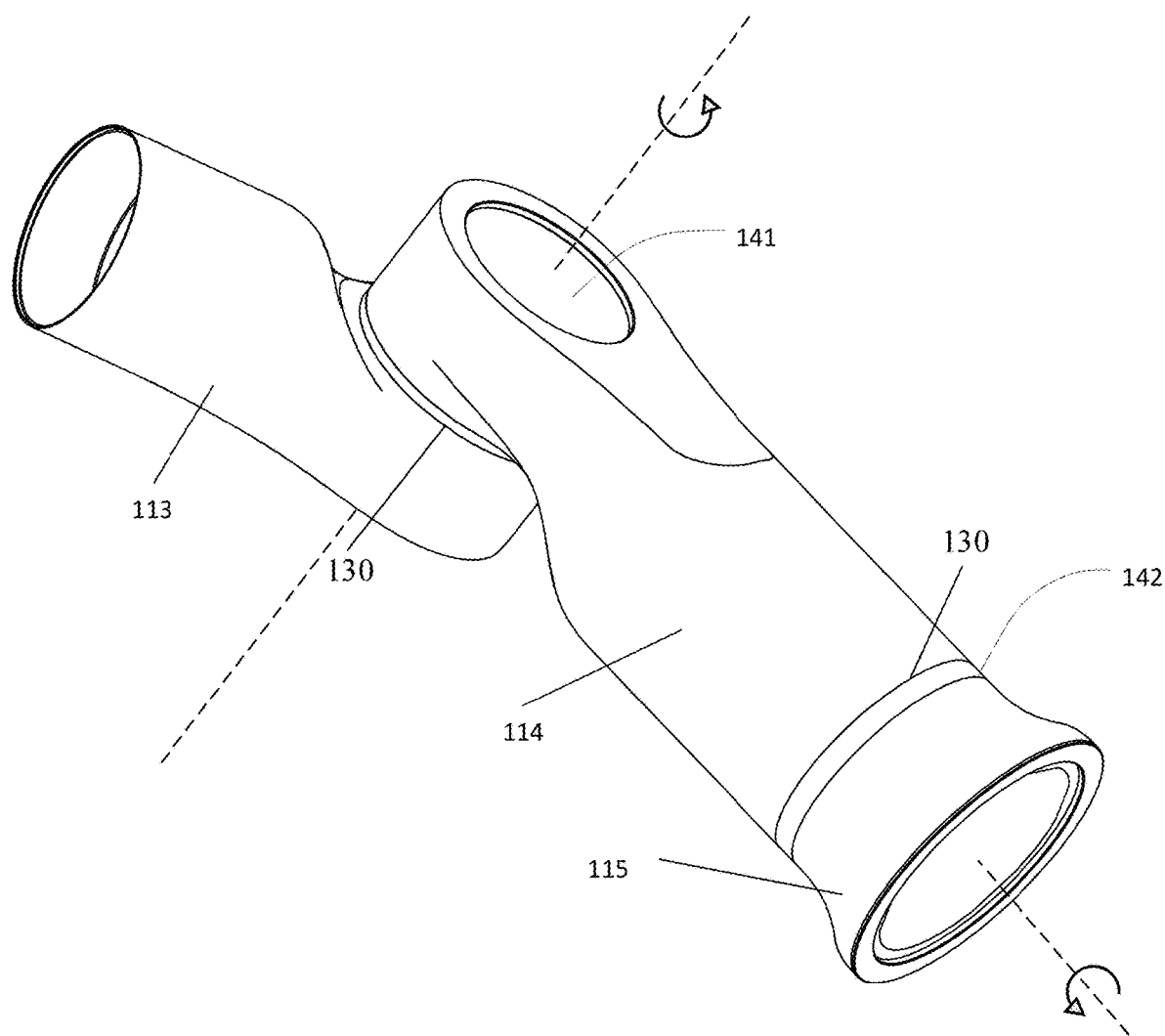
FIG. 2 illustrates an isometric view of part of a robotic arm according to an embodiment of the present disclosure.

In various embodiments of the present disclosure, two adjacent links 110 may form a pitch joint or a roll joint. For example, FIG. 2 illustrates that the links 113 and 114 may cooperatively form a pitch joint 141 that rotates around its respective illustrated axis while the links 114 and 115 may cooperatively form a roll joint 142 which rotates around its respective illustrated axis. In either case, the light device 130 may be located between two links 110 (e.g., between links 113 and 114, or 114 and 115) adjacent to the actuator 120. It should be appreciated that in other embodiments of the present disclosure two adjacent links 110 may form other types of joints.

The light devices 130 may be any type of device capable of generating light, e.g., LED or multi-color LED. In certain embodiments, each light device 130 may correspond to one actuator 120 and may be arranged around the corresponding actuator 120. For example, the light device 130 may have a ring-configuration which extends around the whole circumference of the corresponding actuator 120. In such embodiments, a user of the example robot 100 may observe the light devices 130 at any position relative to the example robot 100. It should be appreciated, however, that in some embodiments the light devices 130 may not extend the whole circumference of the corresponding actuator 120. It should also be appreciated that the light devices 130 may take any number of shapes (e.g. circular, octagonal, decagonal, undulating, etc.). The light devices 130 are exposed at an exterior surface of the example robot 100 such that the operator of the example robot 100 may easily observe the illumination of the light devices 130.

As previously mentioned, in some embodiments of the present disclosure a light device 130 may be located between two adjacent links 110. For example, when two adjacent links 110 are connected together through an actuator 120, there may exist a gap (not shown) between the two links 110, and the light device 130 may be located in this gap. In other embodiments, the light device 130 may be located near the corresponding actuator 120, but not in the above-described gap. For example, the light device 130 corresponding to an actuator 120 may be located at an outer surface of either of the two adjacent links 110 connected by the actuator 120.

FIG. 3 illustrates an example embodiment of two links 110 connected by an actuator 120. For example, the actuator 120 may include a first part 121 and a second part 122 which connect to a first link 111 and a second link 112 respectively. In one embodiment, the first part 121 may be rotatably connected with the second part 122, and the first part 121 may be a driving part while the second part 122 may be a driven part. Accordingly, the actuator 120 may drive the first link 111 to rotate with respect to the second link 112. It should be understood that each actuator 120 may include various components, such as a motor, transmission device, breaker, bearings etc.

In some embodiments, the light device 130 may also include an annular seal 131 and a light emitting device 132. The annular seal 131 may be located between two adjacent links 110 (e.g., the links 111 and 112), and may be made of transparent or translucent material such that light generated by the light emitting device 132 may pass through the annular seal 131 for observation by the operator of the robot 100. It should be appreciated that the annular seal 131 may be any transparent or translucent material capable of preventing dust and water from entering inside the example robot 100. The light emitting device 132 may be located at an inner side of the annular seal 131 in at least one embodiment.

Figure 4:
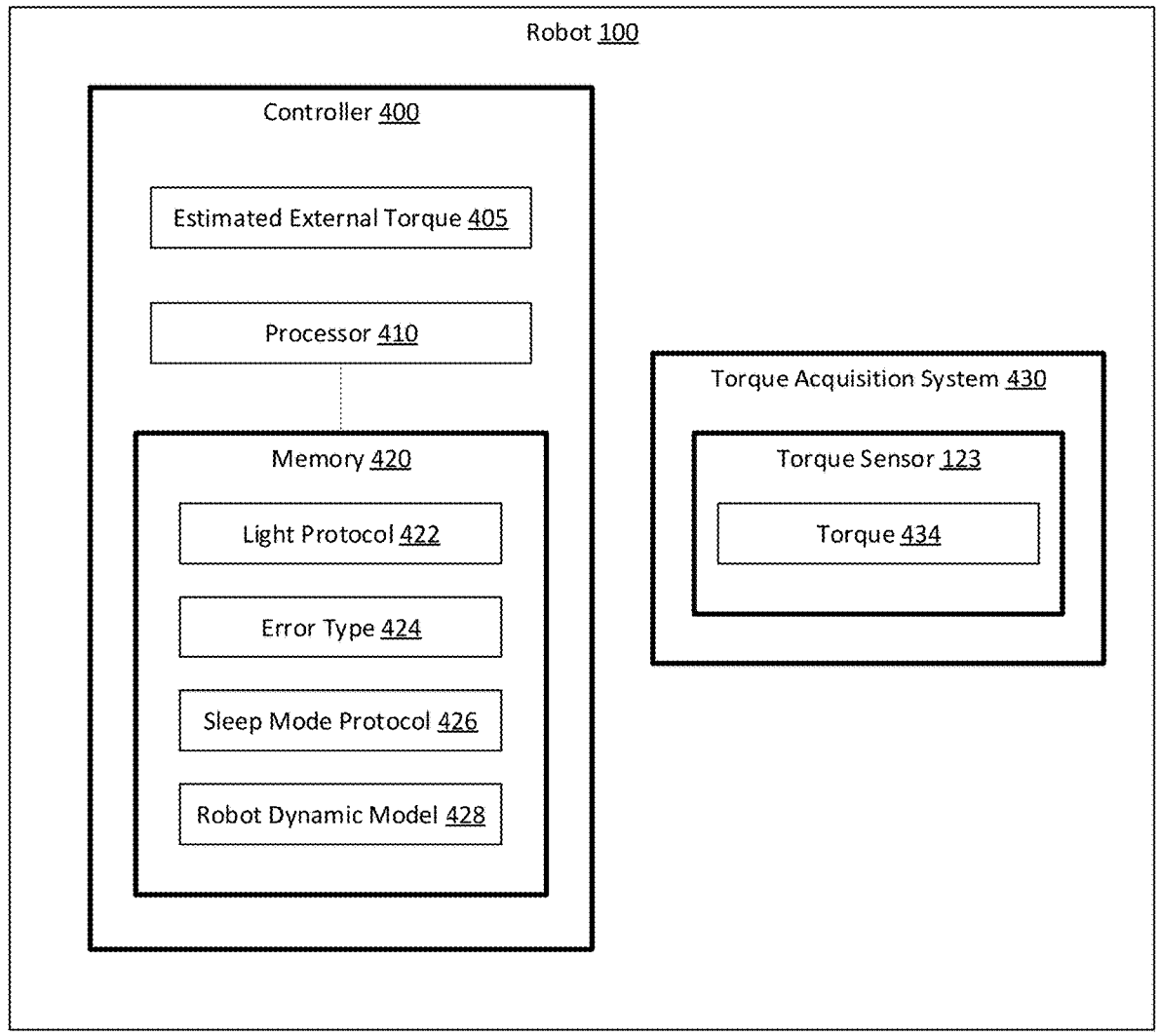
FIG. 4 illustrates a block diagram of a robot according to an embodiment of the present disclosure.

FIG. 4 illustrates a block diagram of the robot 100 according to an exemplary embodiment of the present disclosure. The block diagram may illustrate a control system of the robot 100 configured to control the light devices 130 in response to the state of their corresponding actuators 120. The robot 100 includes a controller 400 and a torque acquisition system 430. It should be appreciated, however, that the controller 400 may be an internal controller of the robot 100 itself as illustrated, or alternatively, may be a controller external to the robot 100.

The controller 400 includes a processor 410 and a memory 420. The controller 400 may be configured to detect the states of the actuators 120 and control the light devices 130 to indicate the state of their corresponding actuators 120. For example, the controller 400 may cause the light devices 130 to output a specific light protocol 422 in response to the controller 400 detecting that an actuator 120 is experiencing a specific error type 424 or that the robot 100 has entered a sleep mode according to a sleep mode protocol 426. The controller 400 may be coupled with the light devices 130 and any sensors present (e.g. the torque sensor 123) in the robot 100. Accordingly, the user of the robot 100 may easily learn the state of the actuators 120 of the robot 100 based on the lighting of the light devices 130 corresponding to each actuator 120.

The memory 420 may also store instructions for execution by the processor 410. For example, the instructions, when executed by the processor 410, may cause the processor 410 to implement one or more functions of the controller 400. The processor 410 may be implemented as one or more of, e.g., a central processing unit (CPU), other general-purpose processor, digital signal processor (DSP), application specific integrated circuit (ASIC), field-programmable gate array (FPGA), other programmable logic device, discrete gates or transistor logic devices, and/or discrete hardware components. The general-purpose processor may be a microprocessor or any other conventional processor.

The memory 420 may be an internal storage unit of the controller 400 such as a hard disk or memory of the controller 400. Alternatively, the memory 420 may be one or more of, e.g., an external storage device of the controller 400, such as a plug-in hard disk, smart media card (SMC), secure digital (SD) card, flash card. In some embodiments, the memory 420 may include both the internal and external storage units of the controller 400. The memory 420 may be utilized to store program instructions and other programs and data necessary for operations of the controller 400. The memory 420 may also be utilized to temporarily store data which has been sent or will soon be sent.

The torque acquisition system 430 may acquire a torque 434 experienced by each actuator 120 in any suitable way. For example, in one aspect of the present disclosure, the torque acquisition system 430 may acquire the drive current of a motor in an actuator 120 and may calculate the torque experienced by the actuator 120 with the drive current. Alternatively, in another aspect of the present disclosure, the torque acquisition system 430 may include a torque sensor 123 in an actuator 120 for measuring the torque, e.g., the torque sensor 123 as illustrated in FIG. 3.

In certain embodiments of the present disclosure, the example robot 100 may enter a sleep mode according to a sleep mode protocol 426. For example, a sleep mode protocol 426 may include instructions for the robot 100 to enter a sleep mode when the robot 100 has been inactive for a certain period of time. In another example, an operator of a robot 100 may enter a command that forces the robot 100 into sleep mode. One or more functions of the robot 100 may be inactive, inoperable, turned off, consuming less power, etc. when the robot 100 is in sleep mode.

In one aspect of the present disclosure, the controller 400 may detect that the robot 100 is in sleep mode and may cause the light devices 130 to display a light protocol 422 to indicate that the robot 100 is in sleep mode. For instance, the light protocol 422 may cause the controller 400 to change the light intensity of each light device 130 by a sinusoidal rhythm to indicate to the operator of the robot 100 that the robot 100 is in sleep mode. That is, the light device 130 may be controlled to present a "breathing light," repeatedly changing from a higher intensity light to a lower intensity light, or no light at all, and back to the higher intensity light. It should be appreciated that the sinusoidal rhythm to indicate sleep mode may be any suitable timing sequence of changing light intensities. In other instances, the light protocol 422 may be a sequence of changing light intensity that is not sinusoidal (e.g., blinking). Alternatively or additionally, the controller 400 may also control the light device 130 to adjust its color to indicate that the robot 100 is in a sleep mode. For example, the light device 130 may be configured to present an orange color when the robot 100 is in sleep mode.

In some embodiments of the present disclosure, the controller 400 may be configured to cause each light device 130 to display a light protocol 422 based on a torque 434 detected in the corresponding actuators 120. For example, the light protocol 422 may include adjusting the light intensity of each light device 130 based on a torque 434 detected in the corresponding actuators 120. In some embodiments, the light protocol 422 may require that the larger the torque 434 experienced by the actuator 120, the higher the light intensity is of the corresponding light device 130. It should be appreciated, however, that the light intensity may vary in any suitable way corresponding to the amount of torque 434 experienced by the actuator 120.

The torque 434 placed on the actuators 120 may be produced by the robot 100 itself, for example, due to its weight and/or motion acceleration, or, the torque 434 may be produced by external forces, such as a human or the environment around the robot 100. For example, a user may interact with the robot 100 by touching or moving its links/arms 110 and may create an external torque upon each actuator 120 as a result. In some embodiments, after the torque acquisition system 430 detects the torque 434 experienced by each actuator 120, the controller 400 may estimate an external torque 405 applied upon each actuator 120 based on the detected torque 434 from the torque acquisition system 430 and a dynamic model 428 of the robot 100. By further considering the dynamic model 428 of the robot 100 along with other information such as joint velocity, acceleration, mass, and inertia, it is possible to calculate the external torque 405 applied upon the actuators 120.

The controller 400 may then cause the light devices to display a light protocol 422 based solely on the estimated external torque 405 applied upon the corresponding actuators 120. For example, the light intensity of one light device 130 may be increased when the external torque 405 applied upon its corresponding actuator 120 increases, while the light intensity of a different light device 130 may remain the same because the external torque 405 applied to its corresponding actuator 120 remained the same. Accordingly, the operator of the robot 100 may easily interpret the external torque 405 applied upon each actuator 120, not including the robot-produced torque, by observing its corresponding light device 130. In some embodiments, the light protocol 422 may cause the controller 400 to adjust the light intensity of the light devices 130 to be proportional to the estimated external torque 405 applied upon the corresponding actuators 120. In this way, when the operator observes that a light device 130 is very bright, he/she may immediately ascertain that the corresponding actuator 120 is bearing a large amount of external torque 405.

In some embodiments of the present disclosure, the controller 400 may be configured to cause the light devices 130 to display a light protocol 422 indicating whether the corresponding actuators 120 are in a normal state or an error state. For example, when an actuator 120 is in a normal state, the light protocol 422 may require that its corresponding light device 130 display a first color, e.g., green. Conversely, when an actuator 120 is in an error state, the light protocol 422 may require that its corresponding light device 130 display a second color, e.g., red. Accordingly, the operator may interpret whether an actuator 120 is in an error state by simply observing the color of its corresponding light device 130.

Additionally or alternatively, the controller 400 may be configured to cause the light devices 130 to display other light protocols 422 indicating that an actuator 120 is in an error state. For example, the light protocol 422 may require the controller 400 to cause a light device 130 to blink or turn off when its corresponding actuator 120 is in an error state, while other light devices 130 corresponding to actuators 120 in a normal state are caused to emit light continuously. In some embodiments, the light protocol 422 may require the controller 400 to cause the light devices 130 to display various blinking patterns that correspond to various error types 424.

Figure 5A:
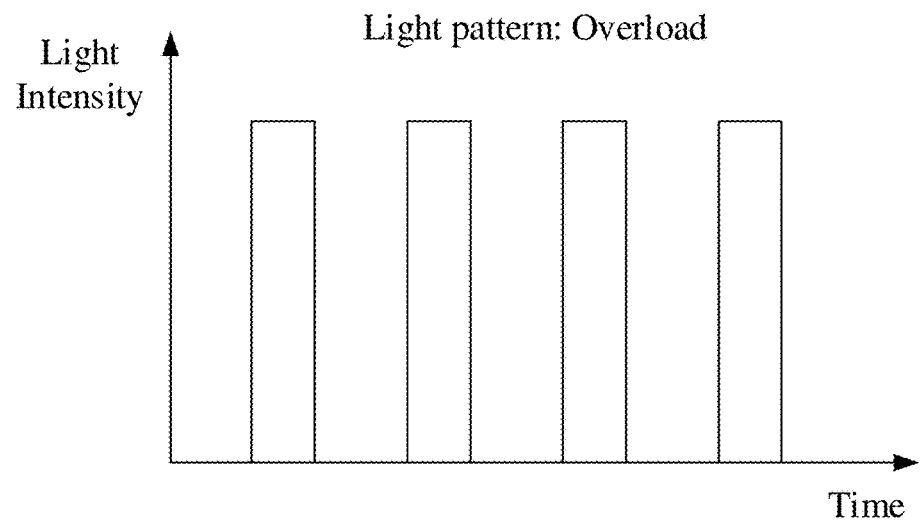
FIGS. 5A, 5B, and 5C show charts illustrating different blinking patterns of a light device according to an embodiment of the present disclosure.
Figure 5B:
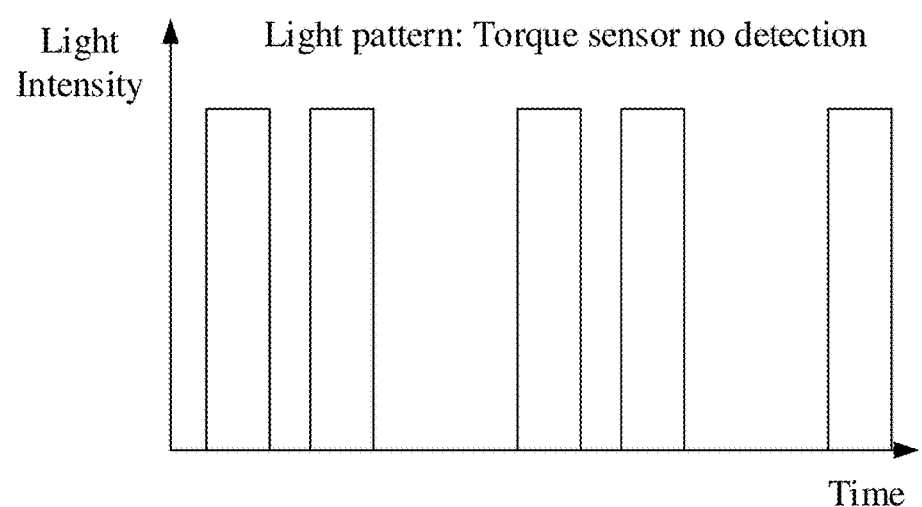
Figure 5C:
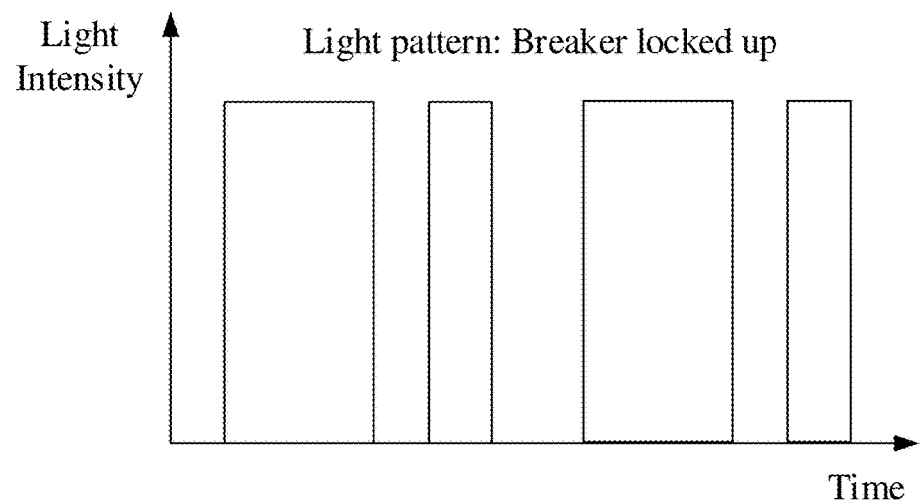

FIGS. 5A-5C illustrate several examples of blinking, or lighting, patterns a light protocol 422 may cause the controller 400 to implement for a light device 130. For instance, FIG. 5A illustrates an example blinking pattern, which may be used to indicate when an actuator 120 is experiencing an external torque 405 overload. The pattern consists of high intensity flashes of light followed by no light on a consistent time basis. FIG. 5B illustrates an example blinking pattern for when an actuator 120 is experiencing no external torque 405 at all. The pattern consists of a repeating two short high intensity flashes of light followed a longer break of no light. FIG. 5C illustrates an example blinking pattern for when an actuator 120 is in an error state, specifically a breaker locked up error type 424. The pattern consists of a repeating longer high intensity flash, shorter high intensity flash, and a period of no light. It should be appreciated that the illustrated blinking patterns are merely example light protocols 422 and that the controller 400 may be configured to generate in the light devices 130 any blinking pattern and any combination of blinking patterns, continuous light, no light, color, and/or any other variances of light to indicate a state of an actuator 120 according to the present disclosure.

In some instances, the state of one or more actuators 120 may be such that more than one light protocol 422 applies. For example, an actuator may be both experiencing (1) an estimated external torque 405 corresponding to a light protocol 422 that requires the light device 130 to increase its light intensity, and (2) an error state not related to the external torque 405 corresponding to a light protocol 422 that requires the light device 130 to display the color red. In some embodiments, the light protocols 422 may be combined (e.g., the light device 130 displays a red color with increased light intensity). In other embodiments, the light protocols 422 may alternate (e.g., the light device displays a high intensity light, then a red light, then a higher intensity light, etc.). In other embodiments, one light protocol 422 may take precedence over another (e.g., the error is a higher priority so only the red light protocol 422 is implemented). In other embodiments, an entirely unique light protocol 422 is implemented to signal to the operator of the robot 100 that the actuator 120 is experiencing a state corresponding to multiple errors or multiple light protocols 422.

Figure 6A:
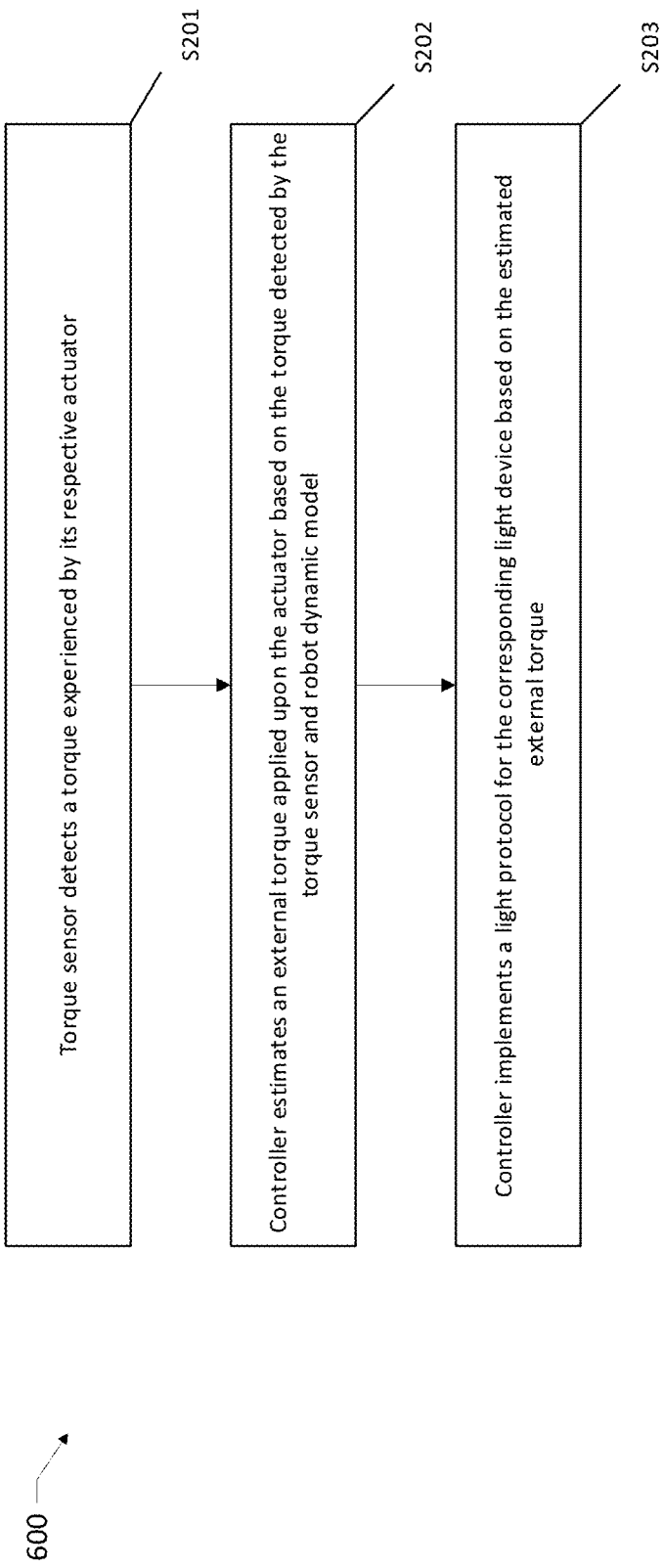
FIGS. 6A, 6B, and 6C illustrate flow charts of methods according to embodiments of the present disclosure.

FIG. 6A illustrates a method 600 according to an exemplary embodiment of the present disclosure. The method 600 may be performed by a robot 100 to implement a light protocol 422 in the light devices 130 based on the amount of estimated external torque 405. The method 600 may be implemented at least in part on a computer system. For example, method 600 may be implemented, at least in part, by the controller 400 and the torque acquisition system 430. The method 600 may also be implemented by a set of instructions stored on a computer readable medium that, when executed by a processor, cause the computer system to perform the method. For example, all or part of the method 600 may be implemented by the processor 410, the memory 420. Although the examples below are described with reference to the flowchart illustrated in FIG. 6A, many other methods of performing the acts associated with FIG. 6A may be used. For example, the order of some of the blocks may be changed, certain blocks may be combined with other blocks, one or more of the blocks may be repeated, and some of the blocks described may be optional.

The example method 600 may begin with a torque sensor 123 in an actuator 120 of the robot 100 detecting a torque 434 experienced by the actuator 120 (block S201). As discussed above, this step in the example method 600 may include the torque acquisition system 430 acquiring the torque 434 in ways other than the use of a torque sensor 123. The controller 400 may then estimate an external torque 405 applied upon each actuator based on the torque 434 detected by the torque sensor 405 and the stored robot dynamic model 428 (block S202). The controller 400 may then implement a light protocol 422 based on the estimated external torque 405 (block S203). For example, the light protocol 422 may require the controller 400 to adjust the light intensity of the light device 130 corresponding to the actuator 120.

Figure 6B:
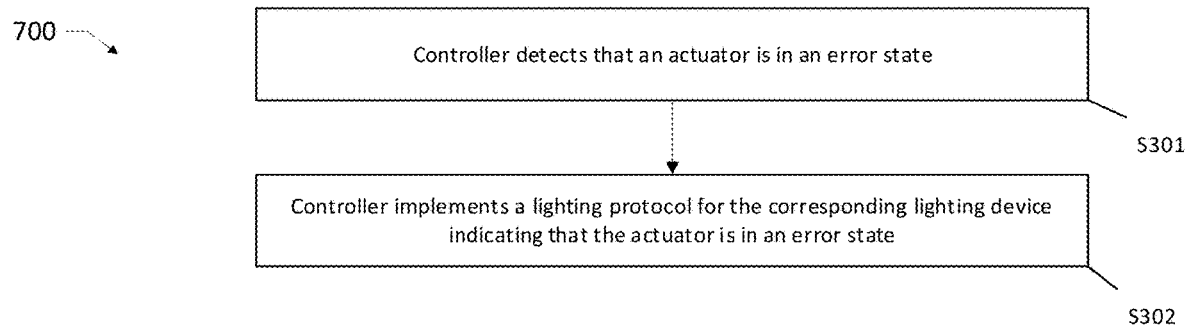

FIG. 6B illustrates an example method 700 according to an exemplary embodiment of the present disclosure. The method 700 may be performed by the controller 400 to implement a light protocol 422 in a light device 130 after detecting an actuator 120 is in an error state. The method 700 may be implemented at least in part on a computer system. For example, method 700 may be implemented, at least in part, by the controller 400. The method 700 may also be implemented by a set of instructions stored on a computer readable medium that, when executed by a processor, cause the computer system to perform the method. For example, all or part of the method 700 may be implemented by the processor 410 and the memory 420.

Although the examples below are described with reference to the flowchart illustrated in FIG. 6B, many other methods of performing the acts associated with FIG. 6B may be used. For example, the order of some of the blocks may be changed, certain blocks may be combined with other blocks, one or more of the blocks may be repeated, and some of the blocks described may be optional.

The example method 700 may begin with the controller 400 detecting that an actuator 120 is in an error state (block S301). As discussed above, in some embodiments, the controller 400 may detect the error type 424 that the actuator 120 is experiencing. The controller 400 may then implement a lighting protocol 422 to indicate that the actuator 120 is in an error state (block S302). For example, the controller 400 may cause the lighting device 130 corresponding to the actuator 120 to display a blinking pattern or a specific color.

Figure 6C:
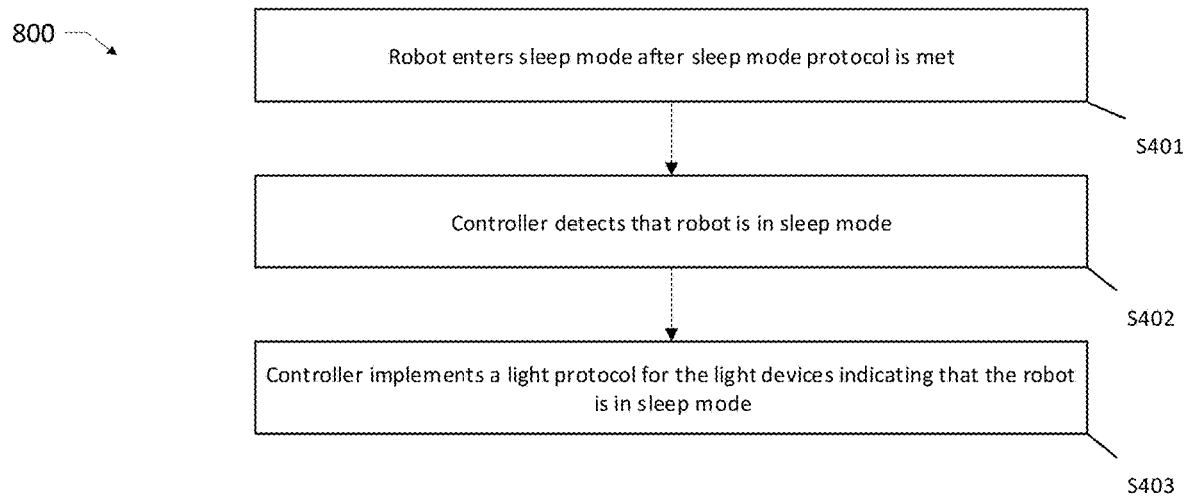

FIG. 6C illustrates an example method 800 according to an exemplary embodiment of the present disclosure. The method 800 may be performed by the robot 100 and the controller 400 to implement a light protocol 422 in a light device 130 after detecting that the robot 100 is in sleep mode. The method 800 may be implemented at least in part on a computer system. For example, method 800 may be implemented, at least in part, by the controller 400. The method 800 may also be implemented by a set of instructions stored on a computer readable medium that, when executed by a processor, cause the computer system to perform the method. For example, all or part of the method 800 may be implemented by the processor 410, the memory 420. Although the examples below are described with reference to the flowchart illustrated in FIG. 6C, many other methods of performing the acts associated with FIG. 6C may be used. For example, the order of some of the blocks may be changed, certain blocks may be combined with other blocks, one or more of the blocks may be repeated, and some of the blocks described may be optional.

The example method 800 may begin with the robot 100 entering a sleep mode after the stored sleep mode protocol 426 is met (block S401). For example, as discussed above, the robot 100 may have been inactive for a certain amount of time. The controller 400 may then detect that the robot 100 is in sleep mode (block S402). The controller 400 may then implement a lighting protocol 422 indicating that the robot 100 is in sleep mode (block S403). For example, the controller 400 may cause the lighting devices 130 of the robot 100 to change light intensity in a sinusoidal rhythm or to display a certain color.

Those of ordinary skill in the art understand that each of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims. In other respects, the discussed or depicted coupling (e.g., direct coupling or communicative coupling) between components may be via one or more wired or wireless interfaces (e.g., electrical and/or mechanical interfaces).

If a software function unit is realized and used as a product, it may be stored in a readable storage medium in a computer. Based on this understanding, the systems and methods described in the present disclosure may be essentially or partially realized as a software product. In other cases, one or more parts of the above-described systems and methods that are beneficial to the conventional technology may be realized as the form of a software product. The software product may be stored in a storage medium, including one or more instructions for a computational device (such as a personal computer, a server, or a network device) to perform all or some of the steps disclosed by the embodiments of the present disclosure. The storage medium may include one or more media capable of storing program codes, such as one or more of a USB disk, a mobile hard disk, a read-only memory (ROM), a random-access memory (RAM), and a floppy disk.

What is claimed is:

1. An industrial robot, comprising:
a plurality of links;
a plurality of actuators connected by the plurality of links;

a plurality of light devices, each arranged around a respective one of the plurality of actuators and between two adjacent ones of the plurality of links; and a controller configured to control each of the plurality of light devices to indicate a state of the respective one of the plurality of actuators.

2. The industrial robot of claim 1, wherein each of the plurality of light devices comprises:

an annular seal located between the two adjacent ones of the plurality of links, wherein the annular seal is transparent or translucent; and a light emitting device located at an inner side of the annular seal.

3. The industrial robot of claim 1, wherein the controller is configured to change a light intensity of each of the plurality of light devices by a sinusoidal rhythm when the industrial robot is in sleep mode.

4. The industrial robot of claim 1, wherein the controller is configured to adjust a light intensity of each of the plurality of light devices based on a torque detected in the respective one of the plurality of actuators.

5. The industrial robot of claim 4, further comprising:

a plurality of torque sensors, each configured to detect a torque experienced by a respective one of the plurality of actuators;

wherein the controller is configured to estimate an external torque applied upon the plurality of actuators based on the torque detected by the plurality of torque sensors and a dynamic model of the industrial robot, and to adjust the light intensity of the plurality of light devices based on the estimated external torque applied upon the plurality of actuators.

6. The industrial robot of claim 5, wherein the controller is configured to adjust the light intensity of each of the plurality of light devices to be proportional to the estimated external torque applied upon the respective one of the plurality of actuators.

7. The industrial robot of claim 1, wherein when one of the plurality of actuators is in a normal state, the controller is configured to control a respective one of the plurality of light devices to present a first color;

when one of the plurality of actuators is in an error state, the controller is configured to control a respective one of the plurality of light devices to present a second color; and the first color is different from the second color.

8. The industrial robot of claim 1, wherein when one of the plurality of actuators is in an error state, the controller is configured to control a respective one of the plurality of light devices to blink.

9. The industrial robot of claim 8, wherein the controller is further configured to adjust a blinking pattern of the respective one of the plurality of light devices based on an error type of the one of the plurality of actuators.

10. A robot, comprising:

multiple links;

multiple actuators connected by the links;

multiple light devices, each arranged around a respective one of the actuators, wherein each of the light devices comprises:

an annular seal located between two adjacent ones of the links, wherein the annular seal is transparent or translucent; and a light emitting device located at an inner side of the annular seal; and a controller configured to control the light emitting device of each of the light devices to indicate a state of the respective one of the actuators.

11. The robot of claim 10, wherein the controller is configured to change a light intensity of the light emitting device by a sinusoidal rhythm when the robot is in a sleep mode.

12. The robot of claim 10, wherein the controller is configured to adjust a light intensity of the light emitting device of each of the light devices based on a torque detected in the respective one of the actuators.

13. The robot of claim 12, further comprising:

multiple torque sensors, each configured to detect a torque experienced by a respective one of the actuators;

wherein the controller is configured to estimate an external torque applied upon the actuators based on the torque detected by the torque sensors and a dynamic model of the robot, and to adjust the light intensity of the light emitting device of each of the light devices based on the estimated external torque applied upon the actuators.

14. The robot of claim 10, wherein when one of the actuators is in a normal state, the controller is configured to control the light emitting device of a respective one of the light devices to present a first color;

when one of the actuators is in an error state, the controller is configured to control the light emitting device of a respective one of the light devices to present a second color; and the first color is different from the second color.

15. The robot of claim 10, wherein when the actuators include an actuator in an error state, the controller is configured to control the light emitting device of a respective one of the light devices to blink; and a blinking pattern of the light emitting device is based on an error type of the actuator in the error state.

* * * * *